(12) United States Patent
Edwards et al.

(10) Patent No.: US 10,838,845 B2
(45) Date of Patent: Nov. 17, 2020

(54) PROCESSING FAILED EVENTS ON AN APPLICATION SERVER

(71) Applicant: INTERNATIONAL BUSINESS MACHINES CORPORATION, Armonk, NY (US)

(72) Inventors: Andrew S. M. Edwards, Southampton (GB); Doina L. Klinger, Winchester (GB); Martin A. Ross, Gosport (GB); Paul S. M. Thorpe, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 15/622,715

(22) Filed: Jun. 14, 2017

(65) Prior Publication Data
US 2018/0365126 A1    Dec. 20, 2018

(51) Int. Cl.
*G06F 11/00* (2006.01)
*G06F 11/36* (2006.01)
(Continued)

(52) U.S. Cl.
CPC ........ *G06F 11/3612* (2013.01); *G06F 9/4881* (2013.01); *G06F 11/0709* (2013.01);
(Continued)

(58) Field of Classification Search
CPC .... G06F 11/3612; G06F 11/366; G06F 11/36; G06F 11/362; G06F 11/3664; G06F 11/30; G06F 11/3003; G06F 11/3006; G06F 11/302; G06F 11/3065; G06F 11/07; G06F 11/0703; G06F 11/0706; G06F 11/0715; G06F 11/0751; G06F 11/0766; G06F 11/079; G06F 11/0793; G06F 9/542; G06F 9/54; G06F 2209/483
USPC ..... 714/37, 38.1, 38.11, 38.12, 38.13, 38.14, 714/48–49, 57; 717/124, 127, 131–132, 717/154–155, 162
See application file for complete search history.

(56) References Cited

U.S. PATENT DOCUMENTS 7,231,267 B2   6/2007 Bournas et al.
7,458,079 B2   11/2008 Connelly
(Continued)

OTHER PUBLICATIONS

IBM; "Business Process Intelligent enablement to handle failed events during Enterprise Applications"; IP.com; PCOM000131690D; Nov. 15, 2005 (Year: 2005).*

(Continued)

*Primary Examiner* — Anthony J Amoroso
(74) *Attorney, Agent, or Firm* — Schmeiser, Olsen & Watts, LLP; Michael Petrocelli

(57) ABSTRACT

The present invention is a method and system for an application server to process failed events of a predetermined software flow. An event generator generates an event to include event data and a related processing flow of a software application which processes the event. Each processing flow has a unique flow ID. An event queue is populated with events, and the processing flow is processed by an event processor. When an event fails, the application server deletes the event and its related processing flow from the event queue, then inserts and links the failed event, its related software application and processing flow, and one or more reasons for failure into a failed event queue.

20 Claims, 6 Drawing Sheets

(51) Int. Cl.
 *G06F 9/48* (2006.01)
 *G06F 11/07* (2006.01)
(52) U.S. Cl.
 CPC ........ *G06F 11/079* (2013.01); *G06F 11/0769* (2013.01); *G06F 11/0793* (2013.01); *G06F 11/366* (2013.01); *G06F 2209/483* (2013.01)

(56) References Cited

U.S. PATENT DOCUMENTS

| | | | |
|---|---|---|---|
| 8,381,030 B2 | 2/2013 | Matov et al. | |
| 8,504,872 B1 | 8/2013 | Watson et al. | |
| 9,015,533 B1* | 4/2015 | Fateev | G06F 11/3636 714/38.1 |
| 2013/0262923 A1 | 10/2013 | Benson et al. | |
| 2014/0075239 A1* | 3/2014 | Prathipati | H04L 67/1097 714/4.1 |
| 2017/0061351 A1* | 3/2017 | Lee | G06F 11/0793 |
| 2017/0168867 A1* | 6/2017 | Ota | G06F 9/546 |

OTHER PUBLICATIONS

IBM; "Business Process Intelligent enablement to handle failed events during Enterprise Applications"; IP.com Prior Art Database Technical Disclosure; IPCOM000131690D; https://ip.com/IPCOM/000131690; Nov. 15, 2005 (Year: 2005).*

Tanenbaum, Andrew S. "1.4 Hardware, Software, and Multilevel Machines." in Structured Computer Organization, pp. 11-13. 3rd ed. Prentice-Hall, 1990. (Year: 1990).*

IBM; Business Process Intelligent enablement to handle failed events during Enterprise Applications; IP.com; IPCOM000131690D; Nov. 15, 2005; 7 pages.

Gupta, Varun; Using Dead Letter Queue Handler in WebSphere MQ; http://www.ibm.com/developerworks/websphere/library/techarticles/1204_gupta/1204_gupta.html; Apr. 18, 2012; 16 pages.

NET Framework; Using Dead-Letter Queues to Handle Message Transfer Failures; Retrieved from the Internet Dec. 30, 2016; URL: https://msdn.microsoft.com/en-us/library/ms789035(v=vs.110).aspx; 6 pages.

* cited by examiner

US 10,838,845 B2

PROCESSING FAILED EVENTS ON AN APPLICATION SERVER

TECHNICAL FIELD

The invention relates generally to a system and method for processing failed events of a predetermined flow identified on an application server, and in particular to a system and method for storing failed messages and associated flow instances and enabling replay of a flow instance for a failed message.

BACKGROUND

Cloud-based software applications need to be stateless and scalable. A stateless and scalable architecture for event processing can be achieved in a flow engine component by retrieving a flow document detailing the flow logic to be performed on a request-by-request basis and not keeping instances of the flows in memory. This makes the application scalable but it makes error handling more challenging, such as for dealing with poison messages or with issues with a particular flow. If a request fails, and it is determined that the most appropriate remedial action is to retry the request, for example if a downstream service is not responding, then the flow may no longer be available for retrieval. Accordingly, there is a need for improved systems and methods of processing failed events on an application server.

SUMMARY

The present invention is a method and system for an application server to process failed events of a predetermined software flow. An event generator generates an event to include event data and a related processing flow of a software application which processes the event. Each processing flow has a unique flow ID. An event queue is populated with events, and the processing flow is processed by an event processor. When an event fails, the application server deletes the event and its related processing flow from the event queue, then inserts and links the failed event, its related software application and processing flow, and one or more reasons for failure into a failed event queue.

One preferred embodiment of the inventive method includes the steps of:
  executing the processing flow by an event processor of the application server;
  determining, by the application server, when an event fails then deleting the failed event and processing flow from an event queue; and
  inserting by linking together by the application server, the failed event, the software application, the processing flow, and a reason for failure into a failed event queue.

Another preferred embodiment of the inventive method includes the steps of:
  generating one or more events by an event generator of the application server, wherein each event includes event data and a related processing flow of a software application processing the event, and wherein each processing flow is identified with a unique flow ID;
  populating, by the application server, an event queue with the one or more events, wherein said application server is defined as a software framework for creating web applications and a server environment to run the web applications;
  executing each said processing flow by an event processor of the application server;
  determining, by the application server, when an event fails then deleting the failed event and related processing flow of the software application from the event queue;
  inserting and linking together, by the application server, the failed event, the related software application, the related processing flow of the software application, and one or more reasons for failure into a failed event queue;
  analyzing, by a failed event handler of the application server, the failed event, the related software application, the related processing flow of the software application, and the reasons for failure to a failed event queue; and
  correcting, by the failed event handler of the application server, the failed event in response to analyzing the reasons for failure.

DETAILED DESCRIPTION

Figure 1:
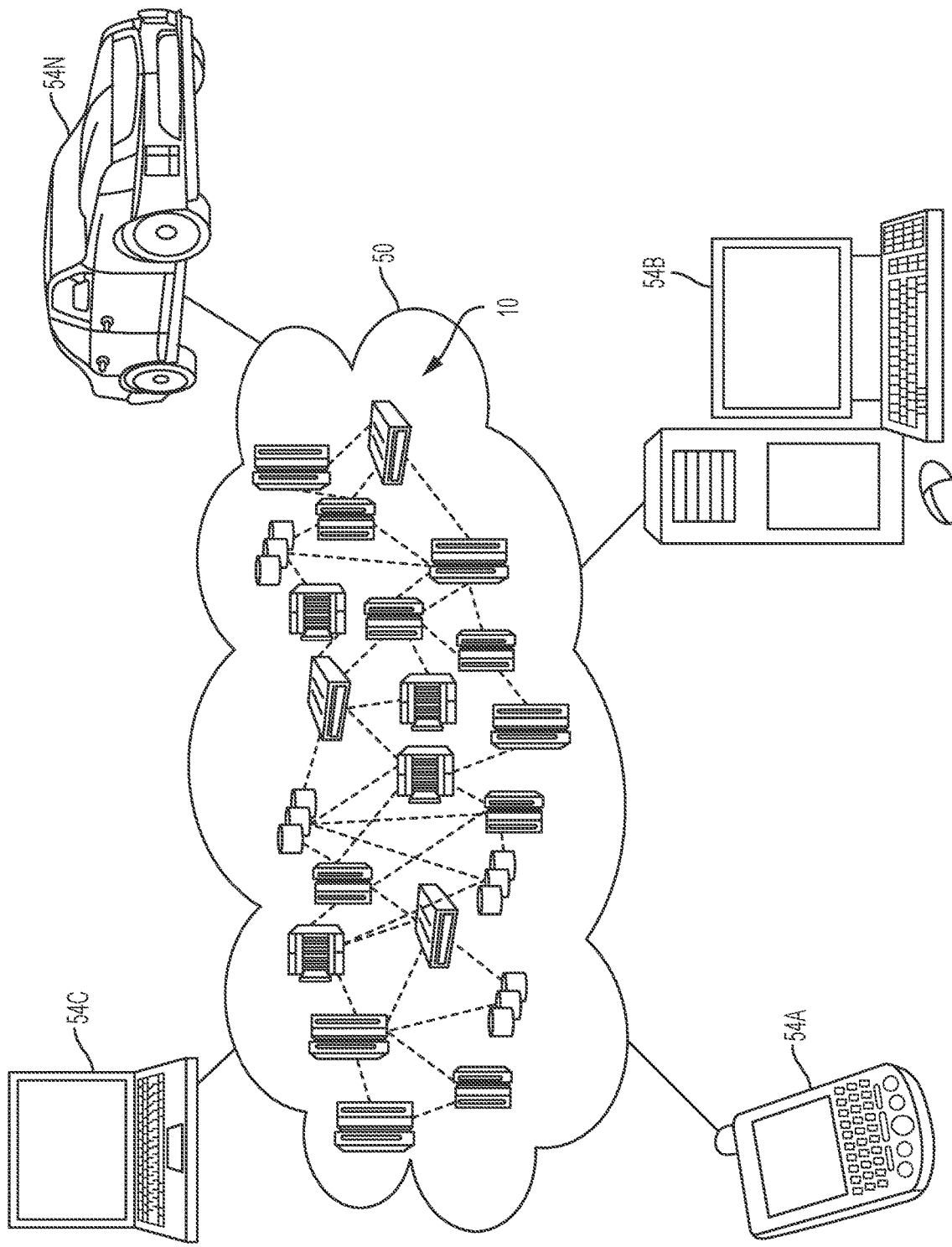
FIG. 1 depicts a cloud computing environment according to an embodiment of the present invention.

In the following description, specific details are set forth although it should be appreciated by one of ordinary skill that the present invention can be practiced without at least some of the details. In some instances, known features or processes are not described in detail so as not to obscure the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
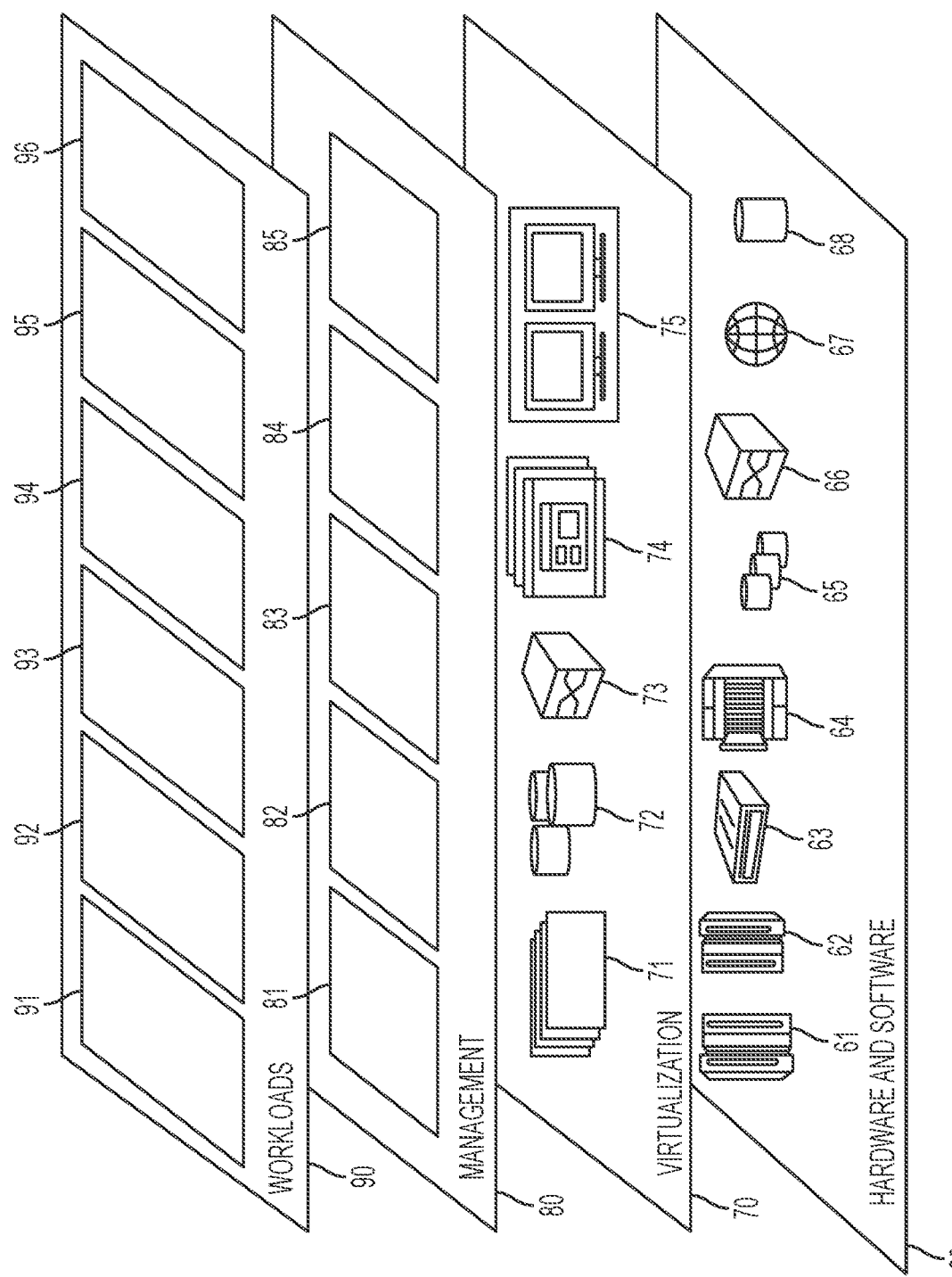
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing failed events of a predetermined software flow identified in an application server 96.

Cloud-based applications need to be stateless and scalable. A stateless and scalable architecture for event processing by retrieving a flow document can be achieved in a flow engine component detailing the flow logic to be performed on a request-by-request basis and not keeping instances of the flows in memory. This makes the application scalable but it makes error handling more challenging, such as for dealing with poison messages or with issues having a particular flow. If a request fails, and it is determined that the most appropriate remedial action is to retry the request (for example, if a downstream service is not responding), then the flow may no longer be available for retrieval.

The above issues can be addressed by enabling replay of a flow instance for a failed message in a system where flows may change readily through use of a dead letter queue type of system that stores not just failed messages, but also stores the flow instances that process, and are related to, the failed messages. Thereafter, appropriate behavior and/or action following a failed event can be determined based upon the analysis of the failure information.

Figure 3:
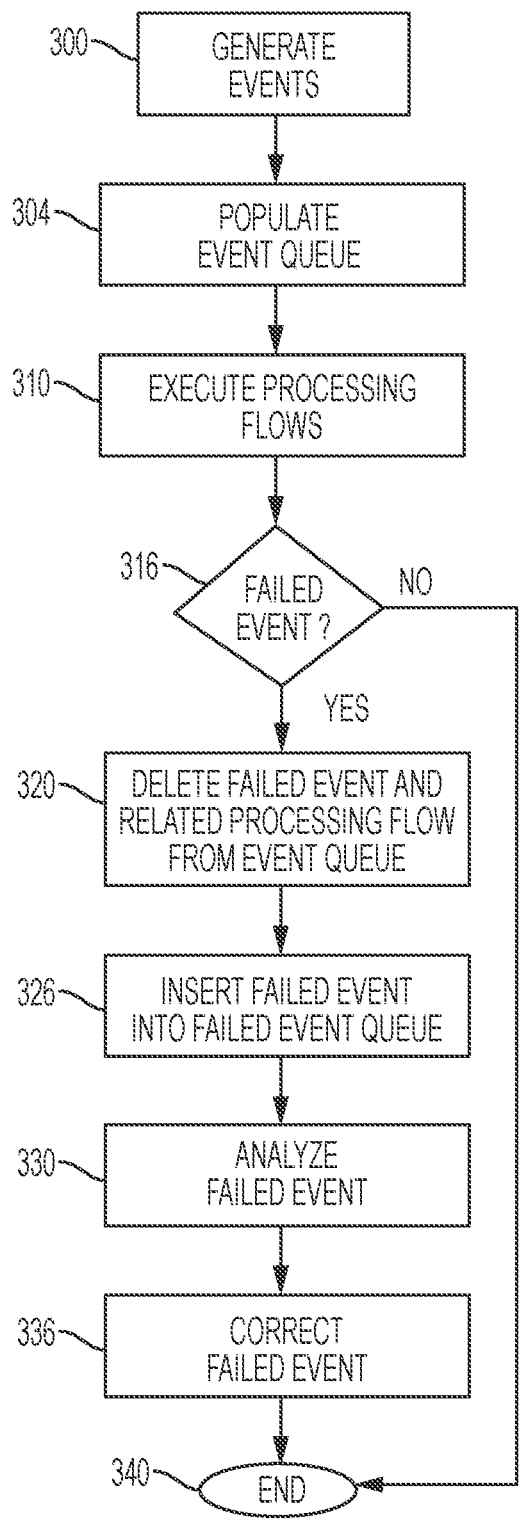
FIG. 3 is a flow chart diagram of a method for processing failed events of a predetermined flow identified on an application server in accordance with embodiments of the present invention.

FIG. 3 is a flow chart diagram of a method for processing failed events of a predetermined flow identified on an application server in accordance with embodiments of the present invention.

Step 300 generates one or more events by an event generator of an application server which is defined as a software framework for creating software applications and a server environment to run the software applications. Each event includes event data and a related processing flow of a software application for processing the event. Moreover, each processing flow is identified with a unique flow ID identification. An event queue is populated by the application server with the one or more events in step 304.

The processing flow of each related event is executed in step 310 by an event processor of the application server. The application server thereafter determines in step 316 when an event fails, deleting the failed event and its related processing flow of the software application from the event queue. If a specific event and its relating processing flow does not experience a failure as tested in decision step 316, then the process ends in step 340 for that particular pairing of the event and its related processing flow. However, if a failed event is detected in step 316, then the process continues to step 320 where the failed event and its related processing flow is deleted from the event queue.

In step 326 the failed event is inserted by the application server to a failed event queue along with data or a link to: the related software application, the related processing flow of the software application, and one or more reasons for failure. Each of these items can be inserted into the failed event queue, or they can be linked or indexed in the failed event queue to point to the relevant information stored in a different location. For instance, a database can include a list of reasons for failure which can be individually indexed for linking back to the failed event queue.

An analysis occurs in step 330 to determine what caused the event to fail. This analysis takes into account data of the related software application, the related processing flow of the software application, and specific user account data for a given user. Any given user can establish his/her own event profile including specific parameters and requirements for selected events to follow a predetermined (e.g. default or selected) software flow of one or more software routines needed to complete each given event. All of the related failure information is analyzed by a failed event handler of the application server to determine a cause(s) of the failure which is logged into the failed event queue. Notably the failed event queue stores data related for each failed event, such as but not limited to: the failed event and event ID; the software flow associated with processing the failed event; the software application(s) related to the failed event; the user account data of the given user who has executed the failed event; and the reason(s) for failure of the failed event. Corrective action is initiated by the failed event handler in step 336 in response to the failure analysis. Once corrective action is taken, the process ends in step 340 for that specific event.

Typically the failed event handler of the application server will enable replay of a flowed instance of the failed event to include a corrective action for correcting the failed event. The corrective action could be an action determined from empirical data to have a highest likelihood of success in overcoming the failure. Moreover, the corrective action could be multi-faceted or there could be more than one corrective actions required to overcome the failure. The application server monitors the replay of the flow instance of the failed event to determine whether the replay requires additional corrective action. If additional corrective action is required, then the process continues whereby the failed event handler analyzes: the failed event; the software application; the processing flow; and the previous corrective action. Any required additional corrective action can be determined by repeating the process. The failed event handler: enables a next, e.g. an other, replay of a flow instance of the failed event; applies the additional corrective action; and monitors the most recent replay to determine whether that replay requires any additional corrective action, i.e. a next corrective action. All of the information gathered, analyzed and applied during each replay is stored in a database. For instance the application server will store and link together into the failed event queue: the failed event during each replay, the software application used for each replay, the processing flow of each replay, and the additional corrective action for each replay.

In some cases certain criteria must be met prior to a corrective action being taken. For instance, user entitlement or approval for use of the specific application server, software applications and security settings to enable corrective action can be limiting. Also, it is notable that the application server stores together event data regarding a failed event with the related software application(s) that were in use during the event failure. In this way, the exact path leading to the event failure can be replicated and tested to determine an exact location, timing, and source of failure components of the failed event. The failed event information can be linked to specific software, hardware and/or firmware within the system.

There are no limitations of reasons for failure of failed events. Virtually any hardware or software bug or glitch could result in an event failure and should be logged into the failed event queue for analysis and corrective action. Moreover the failed events could be temporary or permanent and/or related to conditions such as, but not limited to, power consumption, power dissipation, unusual circumstances, faulty hardware or firmware, software bugs, etc. A single or multiple causes or reasons could be attributed to any given failure. A few examples of reasons for failure of a failed event include: an error in the event processor, wherein an operating system is notified; a flow parse error rejecting the flow, wherein a flow service is notified; an event parse error rejecting the event, wherein the event generator is notified; flow failure wherein the failed event is replayed to the event queue without the processing flow; downstream device error, wherein the event is replayed to the event queue including the processing flow; and retry count exceeded error, wherein the event generator is notified that the event has been rejected.

The inventive method as depicted in FIG. 3 provides improved failure event management in computer systems such as SaaS (software as a service) systems, application servers, etc. The method offers reduced resource usage via more intelligent corrective actions which are determined and tested in the exact same environment, under the exact same conditions as the initial failure. This advantage reduces multiple trial-by-error attempts at problem solving an event failure. In sum, the inventive method enables replay of a specific software flow instance resulting in a failed message in a system where software flows may change frequently through the use of a Dead Letter Queue type structure that stores not just failed messages but also the flow instances that processed them. Determining appropriate behavior and corrective action of a failed event is based upon the analysis of the composite and related failure information of the failed event, the associated software and software flow, and the user account details.

Figure 4:
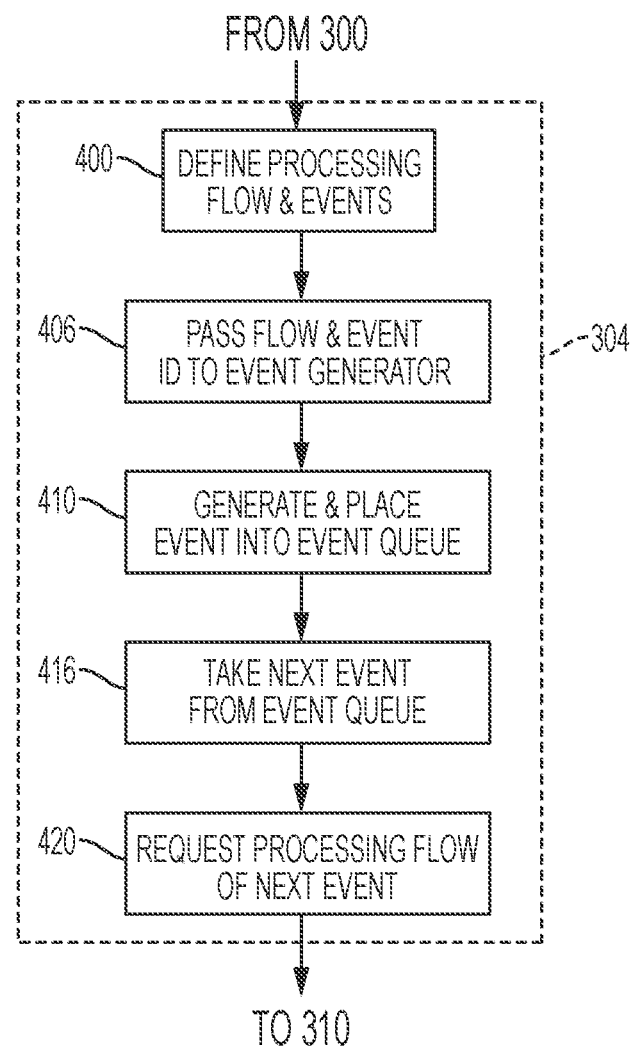
FIG. 4 is a flow chart diagram of a step for populating the event queue in the method of FIG. 3 in accordance with embodiments of the present invention.

FIG. 4 is a flow chart diagram of step 304 for populating the event queue in the method of FIG. 3 in accordance with embodiments of the present invention. Generated events received in step 400 from step 300 are defined (by the application server or the user) to identify the processing flow and related events to be processed on the application server. In step 406 the application server passes an identification of the processing flow and related events to an event generator. In step 410 an event generator of the application server generates the events of the processing flow and places each event into an event queue with the identification of its related processing flow. A next event from the event queue is taken in step 416 by an event processor of the application server, and in step 420 the event processor requests the processing flow of the next event.

Figure 5:
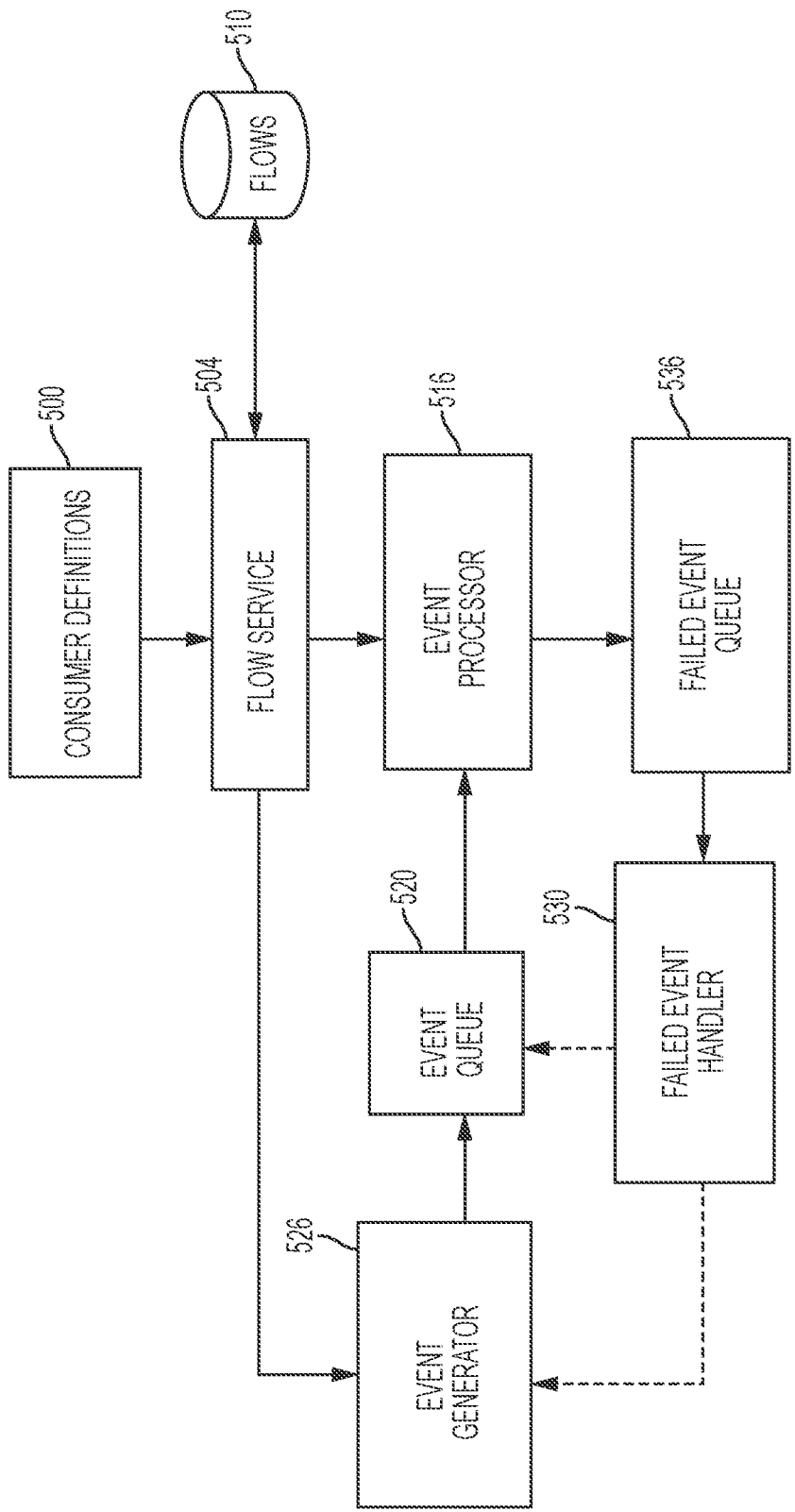
FIG. 5 is a flow chart diagram illustrating both system components and method steps for processing failed events of a predetermined flow identified on an application server in accordance with embodiments of the present invention.

FIG. 5 is a flow chart diagram illustrating system components linked to a method for processing failed events of a predetermined flow identified on an application server in accordance with embodiments of the present invention. FIG. 5 represents both software method steps and hardware devices, thus for clarity the identified items of this flow chart are referred to as flow blocks (which may represent either software or hardware entities).

In flow block 500 a consumer defines both a software flow (i.e. a predetermined flow), and one or more events which can be processed by the given flow. Flows are stored in a flow database 510 and these flows can be transferred to or from the flow database 510 into flow service 504 as necessary to comply with the consumer (user) definitions. Each flow is provided with a unique ID, identification, which is passed via the flow service 504 to an event generator 526. When an event is generated it is sent from the event generator 526 (along with the ID of the software flow which should process the event), for placement onto an event queue 520. The event processor 516 takes a next event from the event queue 520 and requests the related software flow from the flow service 504 using the flow ID. If the flow has been deleted, then the event is discarded. The event processor 516 then executes the flow which may include outbound requests.

If the flow does not complete successfully, then the event is placed onto a secondary queue, i.e. the failed event queue 536, along with the reason for the failure, a link to the relevant software application, and the flow that was used at the point of failure. This occurs so that the exact same version of the software flow can be saved and used when replaying the error message, regardless of whether the software flow has been altered during an interim period by an external source.

The failed event handler 530 takes the next failed event, the reason for the failure, a link to the relevant software application, and the associated software flow from the failed event queue. The failed event handler 530 then analyzes the failure, including stack analysis if necessary, and determines which single remedial action, or series of actions, to take based upon the rules. The rules are predetermined guidelines and criteria for operation of the event and its associated software flow. The results of the analysis of the failed event handler 530 can be passed on to the event generator 526 and/or the event queue 520.

Examples of reasons for failure of a failed event as detected by the failed event handler 530 include: an error in the event processor, wherein an operating system is notified; a flow parse failure notifying the flow service 504 that the flow has been rejected; an event parse failure whereby the the event generator 526 is notified that the event has been rejected; flow failure wherein the failed event is replayed to the event queue 520 without the processing flow (to request a new copy of the flow from the flow service 504); failure of a downstream device to replay the event to the event queue including the processing flow to avoid duplicate flow lookup; and retry count exceeded error, wherein the event generator is notified that the event has been rejected. The above list of potential reasons for failure is exemplary. Other known reasons for identifying and correcting event failures and software flow failures would similarly be subject to identification and remedial action in accordance with embodiments of the inventive system and method.

Figure 6:
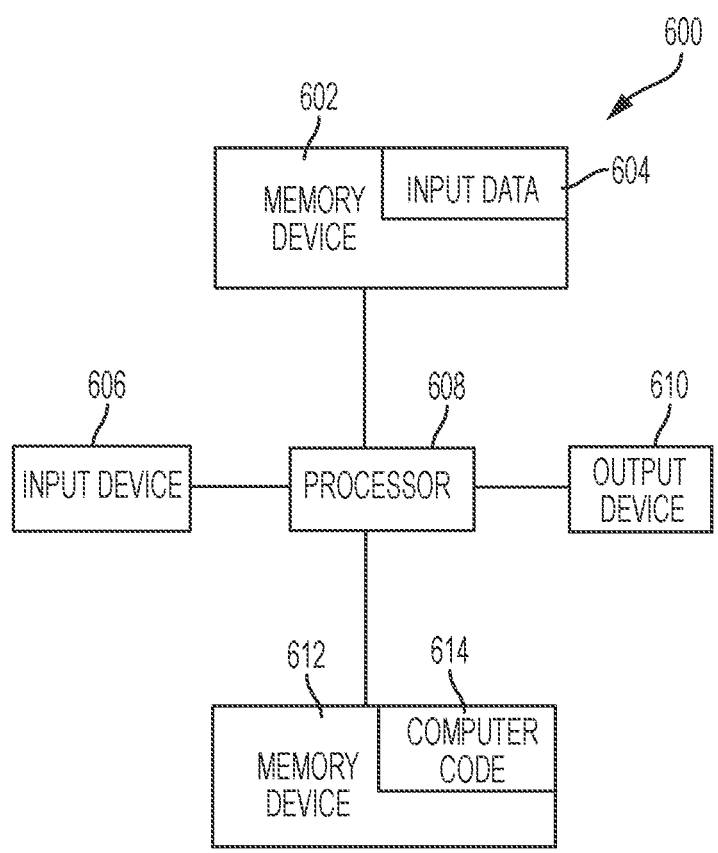
FIG. 6 is a flow chart diagram of an embodiment of a computer system used for implementing the methods of the present invention.

FIG. 6 is a block diagram of a computer system, aka computing device, 600 for implementing search engine optimization based upon most popular search histories in accordance with embodiments of the present invention. The computing device 600 includes a processor 608, an input device 606 coupled to the processor 608, an output device 610 coupled to the processor 608, and memory devices 602 and 612 each coupled to the processor 608. The input device 606 may be, inter alia, a keyboard, a mouse, etc. The output device 610 may be, inter alia, a printer, a plotter, a computer screen, a magnetic tape, a removable hard disk, a floppy disk, etc. The memory devices 602 and 612 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 612 includes a computer code 614 which is a computer program that includes computer-executable instructions.

The computer code 614 includes software or program instructions that may implement an algorithm for implementing methods of the present invention. The processor 608 executes the computer code 614. The memory device 602 includes input data 604. The input data 604 includes input required by the computer code 614. The output device 610 displays output from the computer code 614. Either or both memory devices 602 and 612 (or one or more additional memory devices not shown) may be used as a computer usable storage medium (or program storage device) having a computer readable program embodied therein and/or having other data stored therein, wherein the computer readable program includes the computer code 614.

Generally, a computer program product (or, alternatively, an article of manufacture) of the computer system/device 600 may include the computer usable storage medium (or said program storage device). The processor 608 may represent one or more processors. The memory device 602 and/or the memory device 612 may represent one or more computer readable hardware storage devices and/or one or more memories.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block or step of the flowchart illustrations and/or block diagrams, and combinations of blocks/steps in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block or step in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Software applications (also referred to as applications) are defined herein as any type of computer program designed to perform one or more coordinated functions, tasks or activities on any type of computer system. For the purposes of this document, software applications includes web applications, end-user applications, system applications, database applications and any other type of application that can be encompassed in a software package.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of processing a failed event of a predetermined processing flow of a software application identified on an application server, said method comprising:
   populating, by an event processor of the application server, a first event queue with a plurality of events and a unique flow identifier (ID) of each event's predetermined processing flow in a respective software application that processes each event;
   after said populating, executing the predetermined processing flow of each event by the event processor of the application server;
   determining, by the application server, that an event has failed during said executing wherein the plurality of events comprises the failed event, and then in response:
   (i) deleting, from the first event queue by the application server, the failed event and the unique flow ID of the failed event's predetermined processing flow in the software application that processes the failed event; and
   (ii) inserting, using the application server, the failed event, the software application that processes the failed event, the predetermined processing flow in the software application that processes the failed event, and a reason for the event failure, into a failed event queue, said failed event queue and said first event queue being different queues.

2. The method of claim 1, said method further comprising:
   analyzing, by a failed event handler of the application server, the failed event, the software application, the predetermined processing flow, and the reason for failure; and
   correcting, by the failed event handler of the application server, the failed event in response to analyzing the failed event, the software application that processes the failed event, the predetermined processing flow, and the reason for failure.

3. The method of claim 2, wherein said analyzing by the failed event handler further comprises analyzing user account data of a given user.

4. The method of claim 2, said method further comprising:
   enabling, by the failed event handler of the application server, replay of a flow instance of the failed event to include a corrective action for correcting the failed event; and
   monitoring, by the application server, the replay of the flow instance of the failed event to determine whether the replay requires additional corrective action.

5. The method of claim 4, said method further comprising performing the corrective action which comprises:
   determining the reason of the failed event requiring additional corrective action during the replay by analyzing via the failed event handler of the application server, the failed event, the software application that processes the failed event, the predetermined processing flow in the software application that processes the failed event, and the previous corrective action;
   providing, by the failed event handler of the application server, additional corrective action to correct the reason of the failed event during the replay;
   enabling, by the failed event handler of the application server, an other replay of a flow instance of the failed event during the replay to include the additional corrective action;
   monitoring, by the application server, the other replay of the flow instance of the failed event to determine whether the replay requires a next corrective action; and
   storing, by the application server, the failed event during the other replay, the software application used for the other replay, a related processing flow of the other replay, and the additional corrective action into the failed event queue.

6. The method of claim 1, said method further comprising:
   prior to said populating, generating the plurality of events by an event generator of the application server in cooperation with user input, wherein each event of the plurality of events includes event data and the predetermined processing flow of the respective software application that processes each event.

7. The method of claim 6, wherein said populating the first event queue comprises:
   defining, by the application server, the events and related processing flows to be processed on the application server;
   passing an identification of the events and related processing flows, by the application server to an event generator;
   placing the events into the first event queue with the identification of the events and related processing flows;
   taking, by an event processor of the application server, a next event from the first event queue; and
   requesting, by the event processor of the application server, a processing flow related to the next event.

8. The method of claim 1, wherein the reason for failure of the failed event comprises one or more of the following:
   an error in the event processor, wherein an operating system is notified;
   a flow parse error rejecting the predetermined processing flow, wherein a flow service is notified;

an event parse error rejecting the event, wherein the event generator is notified;

flow failure wherein the failed event is replayed to the first event queue without the predetermined processing flow;

downstream device error, wherein the event is replayed to the first event queue including the predetermined processing flow; and retry count exceeded error, wherein the event generator is notified that the event has been rejected.

9. A computer program product, comprising one or more computer readable hardware storage devices having computer readable program code stored therein, said program code containing instructions executable by a computing device to implement a method of processing a failed event of a predetermined processing flow of a software application identified on an application server, said method comprising:

populating, by an event processor of the application server, a first event queue with a plurality of events and a unique flow identifier (ID) of each event's predetermined processing flow in a respective software application that processes each event;

after said populating, executing the predetermined processing flow of each event by the event processor of the application server;

determining, by the application server, that an event has failed during said executing wherein the plurality of events comprises the failed event, and then in response:

(I) deleting, from the first event queue by the application server, the failed event and the unique flow ID of the failed event's predetermined processing flow in the software application that processes the failed event; and (ii) inserting, using the application server, the failed event, the software application that processes the failed event, the predetermined processing flow in the software application that processes the failed event, and a reason for the event failure, into a failed event queue, said failed event queue and said first event queue being different queues.

10. The computer program product of claim 9, wherein the method further comprises:

analyzing, by a failed event handler of the application server, the failed event, the software application, the predetermined processing flow, and the reason for failure; and correcting, by the failed event handler of the application server, the failed event in response to analyzing the failed event, the software application that processes the failed event, the predetermined processing flow, and the reason for failure.

11. The computer program product of claim 10, wherein said analyzing by the failed event handler further comprises analyzing user account data of a given user.

12. The computer program product of claim 10, wherein the method further comprises:

enabling, by the failed event handler of the application server, replay of a flow instance of the failed event to include a corrective action for correcting the failed event; and monitoring, by the application server, the replay of the flow instance of the failed event to determine whether the replay requires additional corrective action.

13. The computer program product of claim 12, said method further comprising performing the corrective action which comprises:

determining the reason of the failed event requiring additional corrective action during the replay by analyzing via the failed event handler of the application server, the failed event, the software application that processes the failed event, the predetermined processing flow in the software application that processes the failed event, and the previous corrective action;

providing, by the failed event handler of the application server, additional corrective action to correct the reason of the failed event during the replay, enabling, by the failed event handler of the application server, an other replay of a flow instance of the failed event during the replay to include the additional corrective action;

monitoring, by the application server, the other replay of the flow instance of the failed event to determine whether the replay requires a next corrective action; and storing, by the application server, the failed event during the other replay, the software application used for the other replay, a related processing flow of the other replay, and the additional corrective action into the failed event queue.

14. The computer program product of claim 9, wherein the method further comprises:

prior to said populating, generating the plurality of events by an event generator of the application server in cooperation with user input, wherein each event of the plurality of events includes event data and the predetermined processing flow of the respective software application that processes each event.

15. The computer program product of claim, wherein said populating the first event queue comprises:

defining, by the application server, the events and related processing flows to be processed on the application server;

passing an identification of the events and related processing flows, by the application server to an event generator;

placing the events into the first event queue with the identification of the events and related processing flows;

taking, by an event processor of the application server, a next event from the event queue; and requesting, by the event processor of the application server, a processing flow related to the next event.

16. The computer program product of claim 9, wherein the reason for failure of the failed event comprises one or more of the following:

an error in the event processor, wherein an operating system is notified;

a flow parse error rejecting the predetermined processing flow, wherein a flow service is notified;

an event parse error rejecting the event, wherein the event generator is notified;

flow failure wherein the failed event is replayed to the first event queue without the predetermined processing flow;

downstream device error, wherein the event is replayed to the first event queue including the predetermined processing flow; and retry count exceeded error, wherein the event generator is notified that the event has been rejected.

17. A system, comprising a computing device, said computing device comprising one or more processors, one or more memories, and one or more computer readable hardware storage devices, said one or more hardware storage devices containing program code executable by the one or more processors via the one or more memories to implement a method of processing failed events of a predetermined flow identified on an application server, said method comprising:

populating, by an event processor of the application server, a first event queue with a plurality of events and a unique flow identifier (ID) of each event's predetermined processing flow in a respective software application that processes each event;

after said populating, executing the predetermined processing flow of each event by the event processor of the application server;

determining, by the application server, that an event has failed during said executing wherein the plurality of events comprises the failed event, and then in response:

(I) deleting, from the first event queue by the application server, the failed event and the unique flow ID of the failed event's predetermined processing flow in the software application that processes the failed event; and (ii) inserting, using the application server, the failed event, the software application that processes the failed event, the predetermined processing flow in the software application that processes the failed event, and a reason for the event failure, into a failed event queue, said failed event queue and said first event queue being different queues.

18. The system of claim 17, wherein the method further comprises:

analyzing, by a failed event handler of the application server, the failed event, the software application, the predetermined processing flow, and the reason for failure; and correcting, by the failed event handler of the application server, the failed event in response to analyzing the failed event, the software application that processes the failed event, the predetermined processing flow, and the reason for failure.

19. The system of claim 18, wherein the method further comprises:

enabling, by the failed event handler of the application server, replay of a flow instance of the failed event to include a corrective action for correcting the failed event; and monitoring, by the application server, the replay of the flow instance of the failed event to determine whether the replay requires additional corrective action.

20. The system of claim 19, said method further comprising performing the corrective action which comprises:

determining the reason of the failed event requiring additional corrective action during the replay by analyzing via the failed event handler of the application server, the failed event, the software application that processes the failed event, the predetermined processing flow in the software application that processes the failed event, and the previous corrective action;

providing, by the failed event handler of the application server, additional corrective action to correct the reason of the failed event during the replay, enabling, by the failed event handler of the application server, an other replay of a flow instance of the failed event during the replay to include the additional corrective action;

monitoring, by the application server, the other replay of the flow instance of the failed event to determine whether the replay requires a next corrective action; and storing, by the application server, the failed event during the other replay, the software application used for the other replay, a related processing flow of the other replay, and the additional corrective action into the failed event queue.

\* \* \* \* \*